Figure 1:
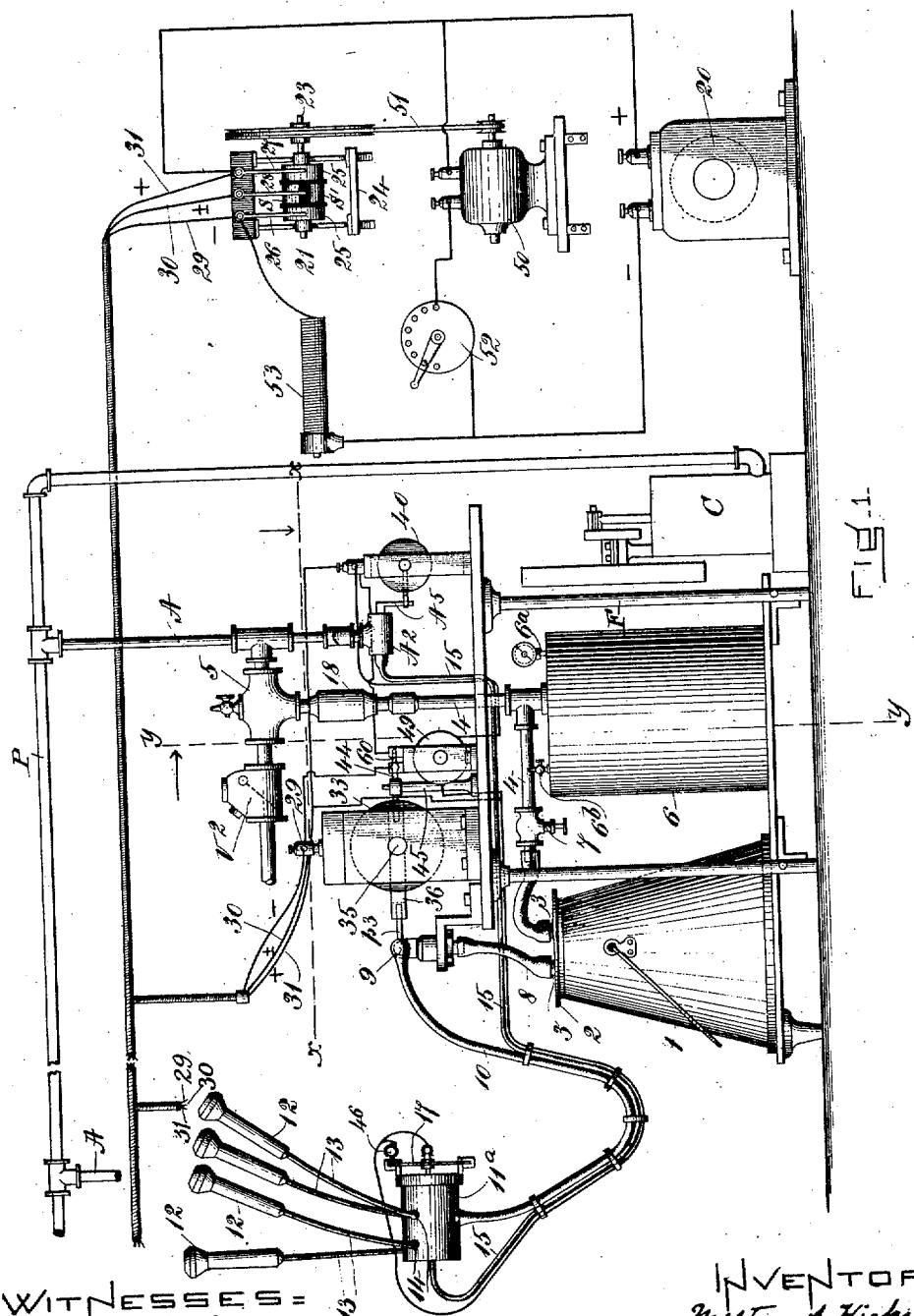

M. A. HICKS.
MILKING MACHINE.
APPLICATION FILED MAY 17, 1907.
961,960.
Patented June 21, 1910.
9 SHEETS—SHEET 5.
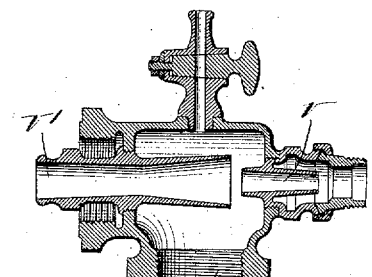
Fig. 7.
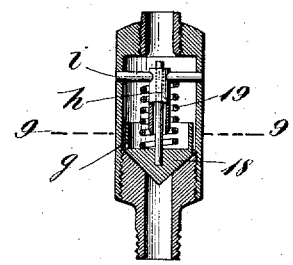
Fig. 8.
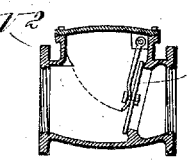
Fig. 7ª.
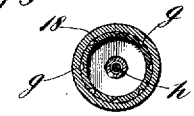
Fig. 9.
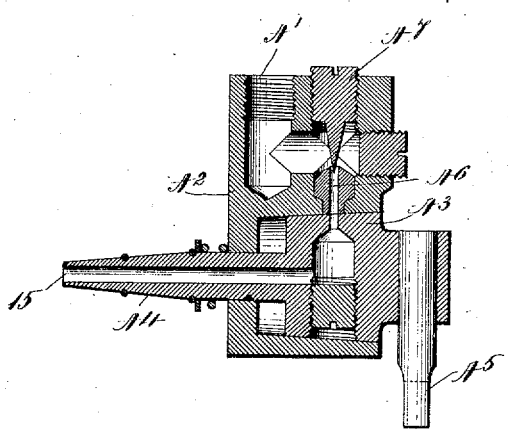
Fig. 10.
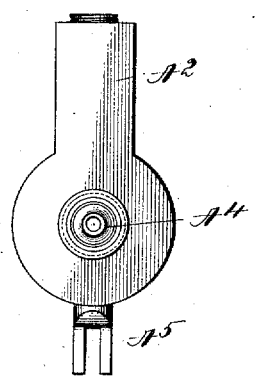
Fig. 11.
WITNESSES:
Frank G. Parker
John Buckler
INVENTOR:
Milton A. Hicks,
By Geo. L. Roberts & Bro.,
Attorneys.

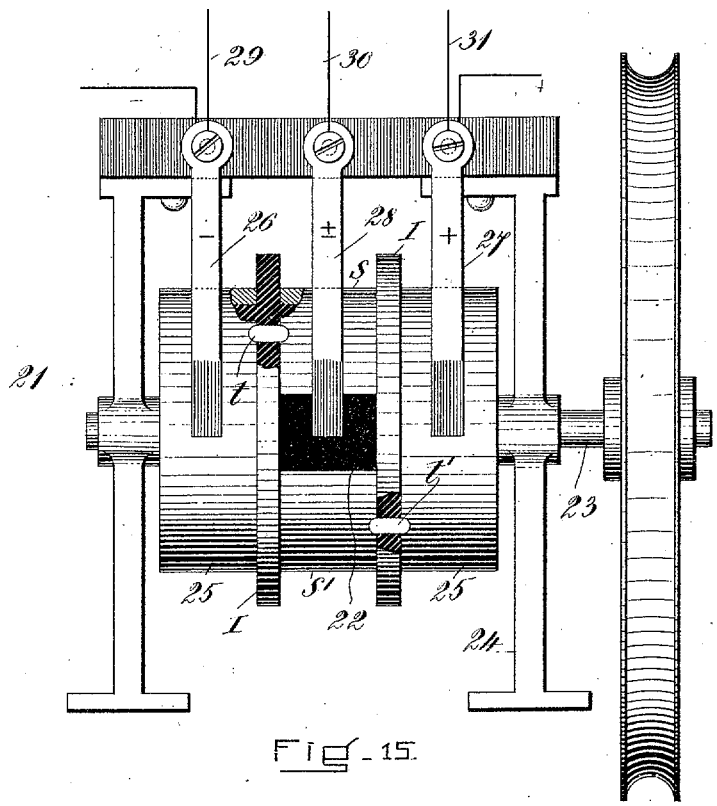
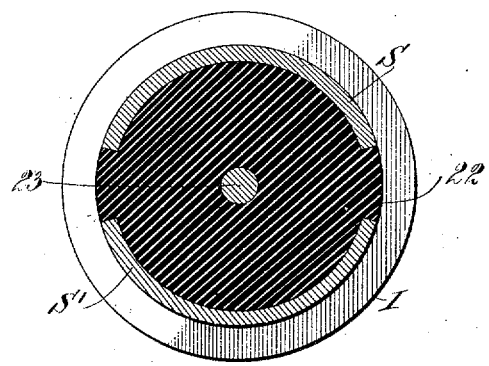

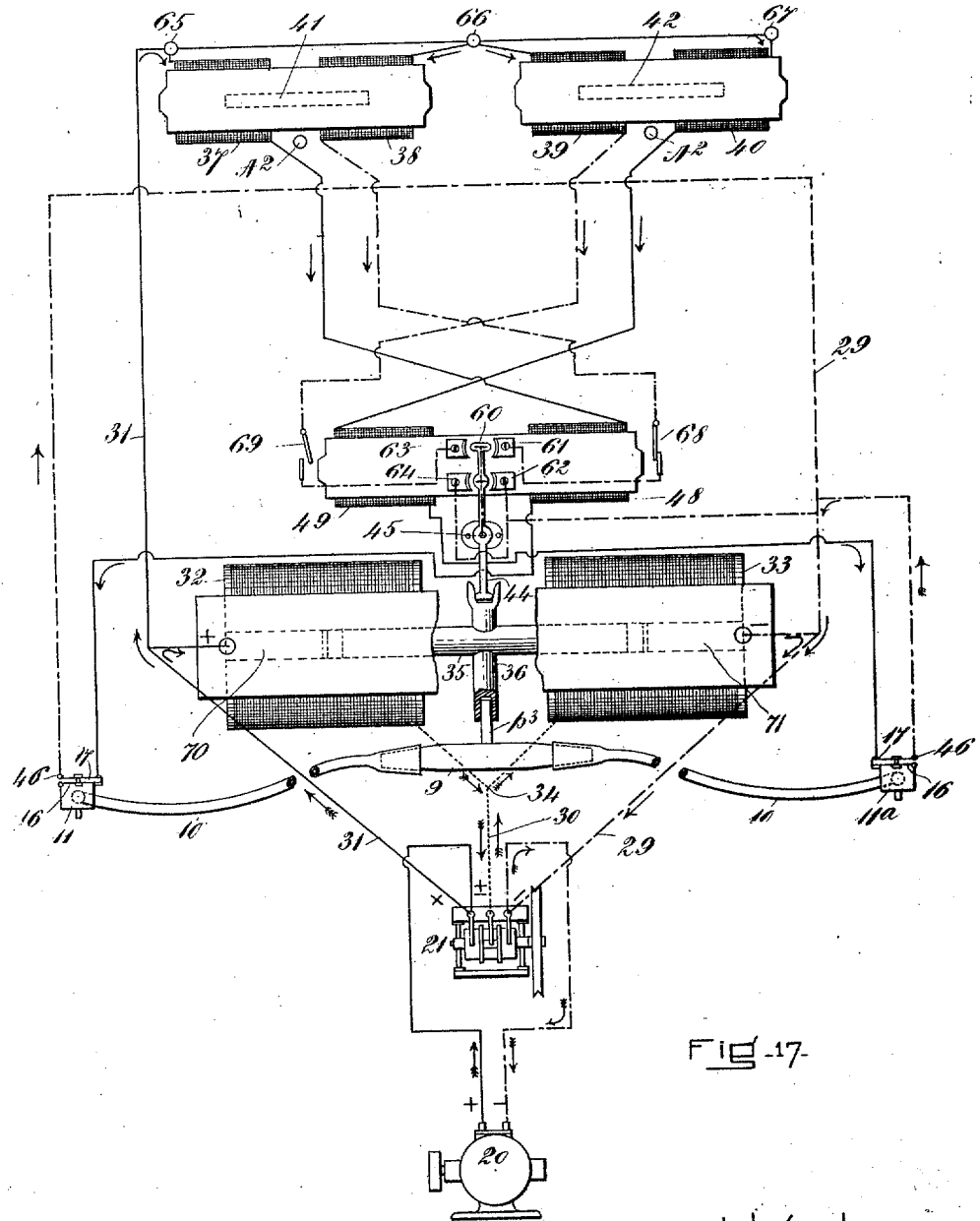

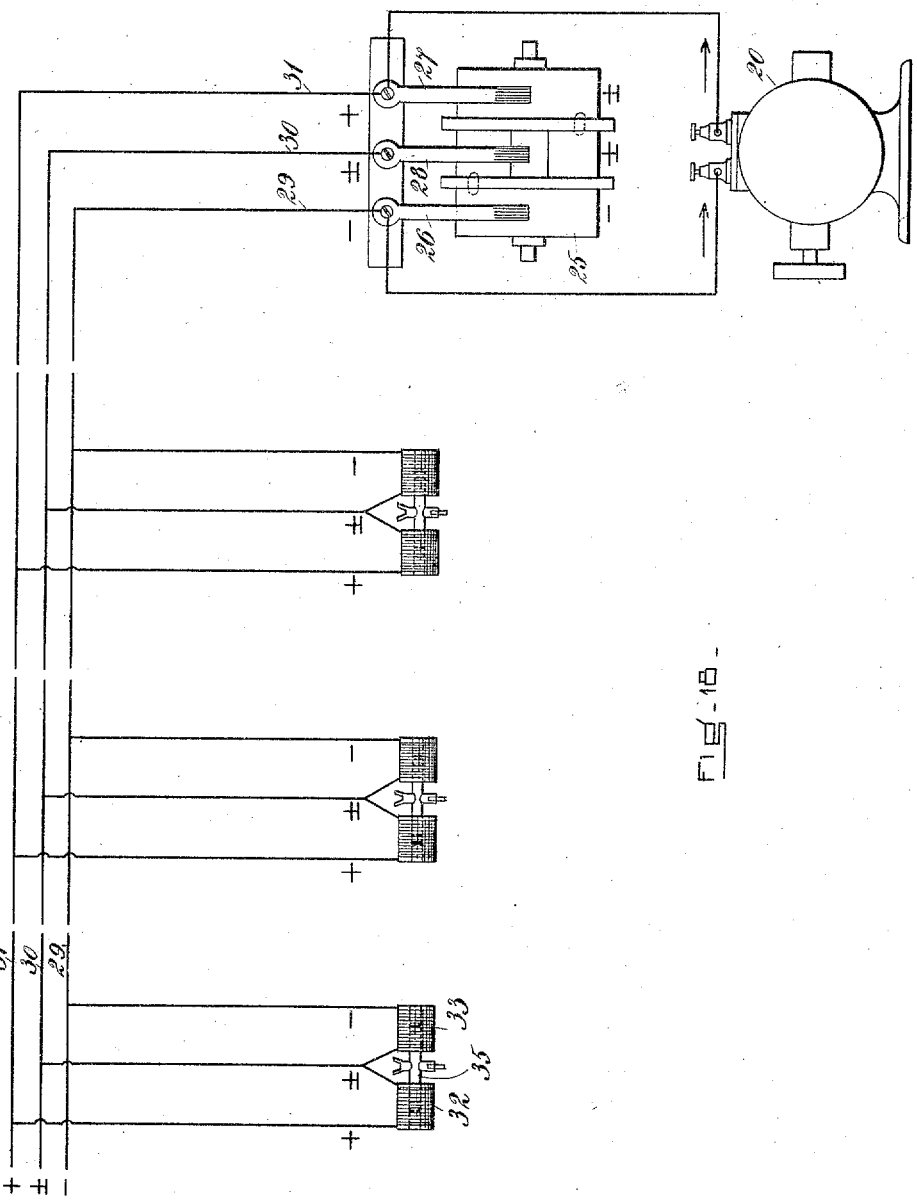

UNITED STATES PATENT OFFICE.

MILTON A. HICKS, OF WEATHERSFIELD, VERMONT, ASSIGNOR TO VERMONT FARM MACHINE COMPANY, OF BELLOWS FALLS, VERMONT, A CORPORATION OF VERMONT.

MILKING-MACHINE.

961,960.   Specification of Letters Patent.   Patented June 21, 1910.

Application filed May 17, 1907. Serial No. 374,264.

*To all whom it may concern:*

Be it known that I, MILTON A. HICKS, a citizen of the United States of America, residing at Weathersfield, in the county of Windsor and State of Vermont, have invented a new and useful Milking-Machine, of which the following is a specification.

This invention relates to cow milking machines of that class generally known as pulsator machines, in which suitable means are employed to vary the suction in the milk pipes and connections, or to give it intermittent action at predetermined intervals, and in a manner as nearly as possible like that of the calf. In machines of this class, compressed air or vacuum producing apparatus or both have been placed at some convenient location in the cow stable, and with pipes extending from such apparatus throughout the length of the stable, from which pipes branch pipes extend to and have been connected with the milking machines located at the several stalls. When such milking machines have been provided with pulsators, these have in some instances been operated by the compressed air, in others, by the vacuum, and in others both the compressed air and vacuum have been employed. In such early machines where a constant suction on the teats was used, all of the milk from the cow was seldom obtained, and therefore pulsators were devised and used, and by this means the degree of suction could be varied or made intermittent, and during the time between pulsations the teats were relieved from the suction and the milk would flow down into them ready to be withdrawn by the next action through the pulsator. Heretofore the pulsating devices have been operated mechanically, or by variation in the degree or periods of application of suction, or compressed air, or both, and a pulsator has been placed near each group of teat-cups and connected by a branch with a common suction pipe leading from a single vacuum apparatus, and extending throughout the length of the stable. By such arrangement there was a great variation in effectiveness of pneumatic action at the several milking stations. The pulsators near to the vacuum apparatus would operate with full efficiency, while as the distance therefrom increased, the efficiency of the action would proportionately decrease, as the action of the pulsators at a distance would become slow, due to the decrease in pneumatic power and the friction of the moving parts of the apparatus. Also, where pulsators are pneumatically operated great care must be exercised in the construction and adjustment of the moving parts to prevent leakage.

My present improvements obviate the above mentioned objections and disadvantages and permit any number of milking machines with their pulsating devices to be employed and located at any distance from the common source of power by which they are operated, and at the same time all will act synchronously and at the same speed and with equal efficiency, irrespective of their location in respect to the source of power.

The invention consists in electrical apparatus substantially such as is hereinafter described, one located at each milking station and all actuated from a common source of electrical supply, with the electrical apparatus at each station mechanically connected to the pulsator there located, and a vacuum producing apparatus at each station to act upon the teat-cups through the pulsator. Further, in means, in the electric circuit, to cause intermittent action upon the pulsators and to vary the strokes or pulsations so as to produce a greater or less number per minute as may be desired, by which a simple and economical construction of milking apparatus is provided, and one reliable and efficient in operation.

Figure 2:
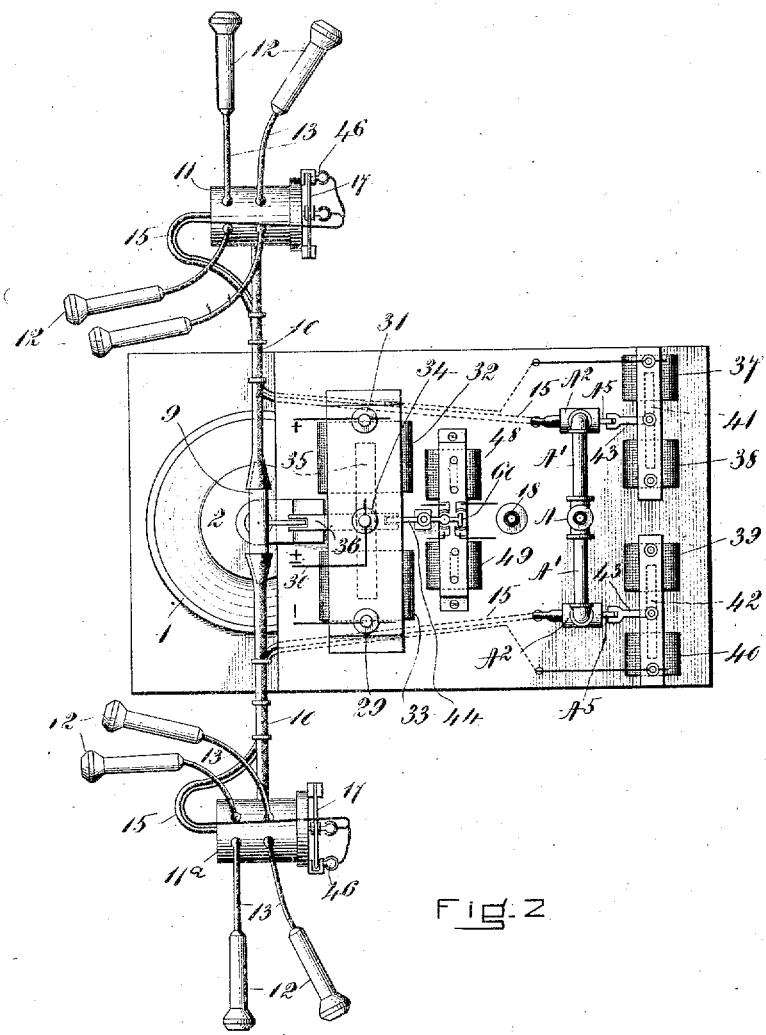
Figure 3:
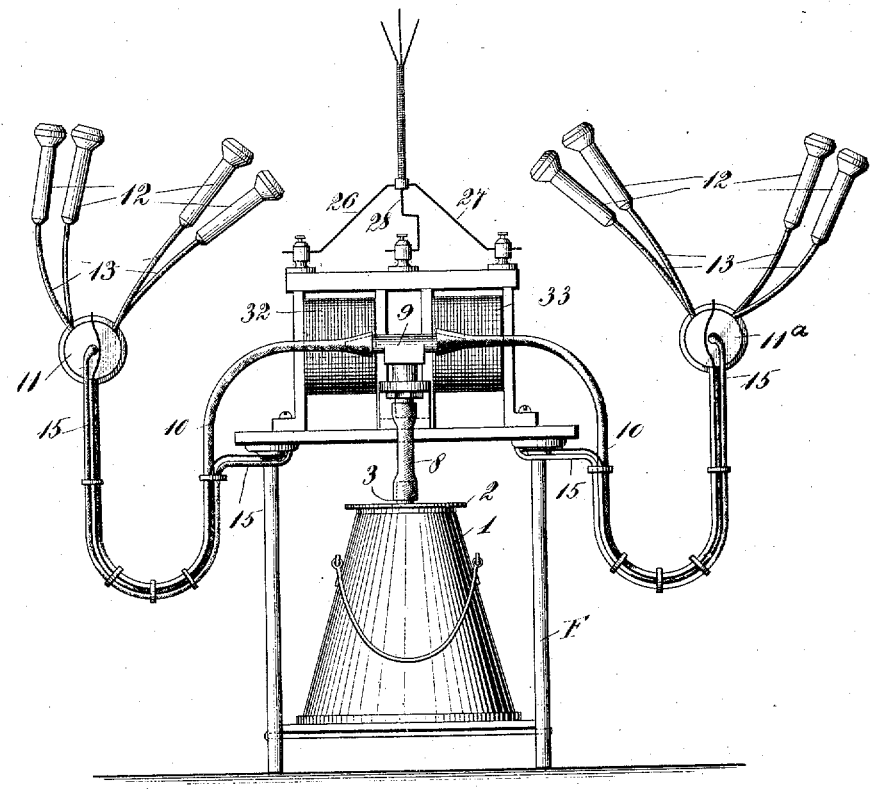
Figure 4:
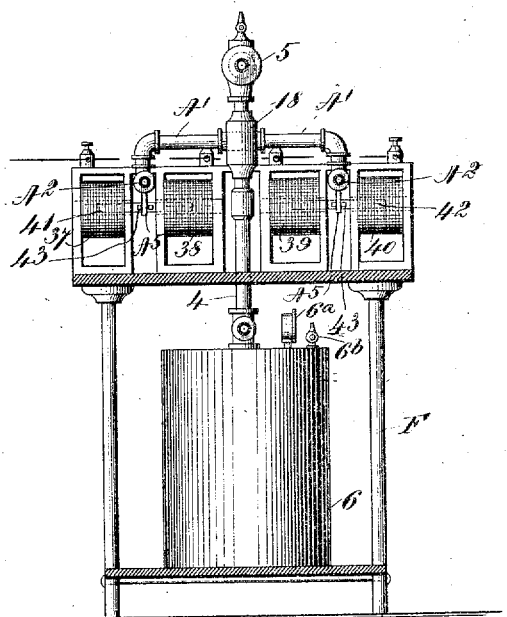
Figures 5, 6:
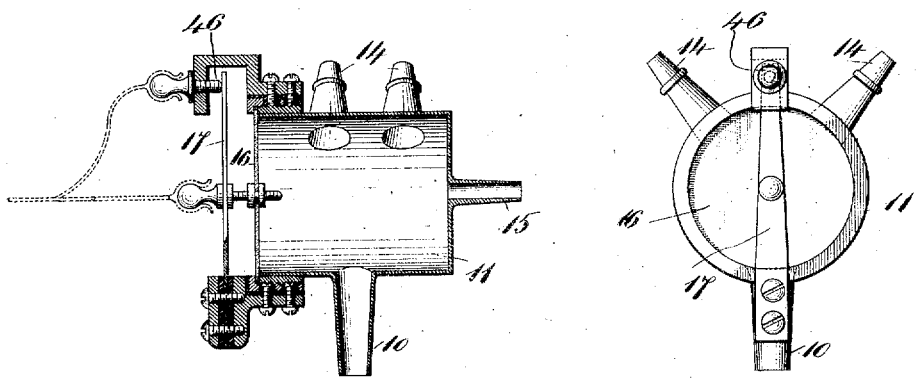
Figure 12:
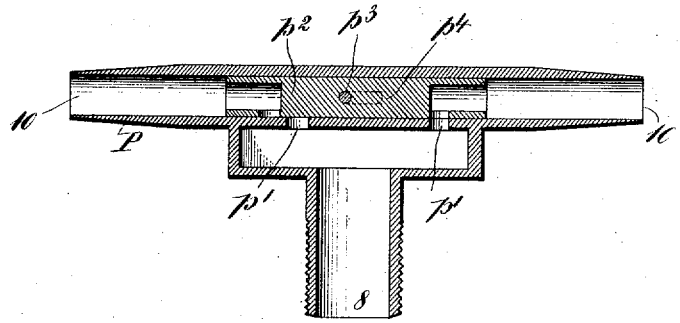
Figure 13:
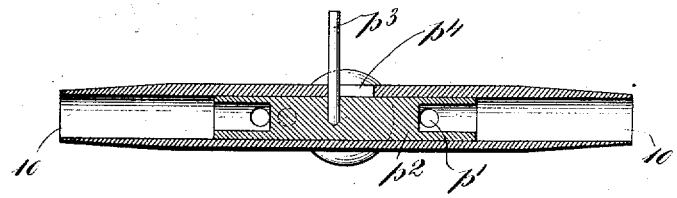
Figure 14:
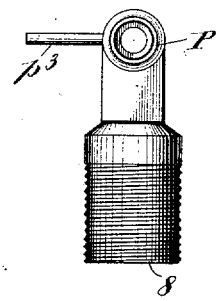

In the drawings forming a part of the specification, Figure 1 is a side elevation of the milking machine, and a diagrammatic illustration of the electrical apparatus and its connections with the milking machine, and the compressed air apparatus and its connections, by which its pulsator and other parts of the machine are operated; Fig. 2 is a plan view of the milking machine with the portion above line $x$—$x$, Fig. 1, removed; Fig. 3 is an elevation of the milking machine viewed from the left of Fig. 1; Fig. 4 is an elevation of the portion of the milking machine to the right of line $y$—$y$, Fig. 1, viewed from the left; Fig. 5 is a central vertical section of what is called the junction-box or chamber, in which the teat-cup tubes and the vacuum and compressed air pipes join; Fig. 6 is an end elevation of the junction-box viewed from the left of Fig. 5; Fig. 7 is a sectional elevation of an ejector vacuum producing device; Fig. 7ª is a vertical section of the check valve through which the ejector discharges; Fig. 8 is a vertical section of the vacuum retaining valve; Fig. 9 is a sectional plan of the same valve on line 9—9, Fig. 8; Fig. 10 is a vertical section of the compressed-air valve; Fig. 11 is an elevation of the same valve viewed from the left of Fig. 10; Fig. 12 is a vertical section of the pulsator; Fig. 13 is a horizontal section through the middle of the pulsator valve; Fig. 14 is an elevation of the pulsator viewed from the left of Fig. 12; Fig. 15 is a front elevation of the make-and-break circuit changer; Fig. 16 is a vertical section of the same through the commutator portion; Fig. 17 is a diagram illustrating the electric connections with the solenoids, and the course of the electric circuits; Fig. 18 is a diagram illustrating a three-wire circuit extending from the commutator to a plurality of milking stations and having the apparatus located at each, connected in multiple with such circuit.

Similar numerals and letters of reference are employed to indicate corresponding parts in the several figures of the drawings.

In connection with these improvements any suitable compressed-air producing apparatus, as C, Fig. 1, may be employed with a storage tank therefor, which is not shown herein. Leading from the tank a pipe P is extended the entire length of the stable and branches A lead to each milking machine. At each milking station is also arranged a milk receptacle 1, having a cap or cover 2 which is provided with a suitable packing ring to prevent the entrance of air; this cap piece is also provided with nipples 3, with one of which a pipe 4 is connected which leads to the vacuum producing device 5, and also is connected to a vacuum reservoir or equalizing chamber 6. A valve 7 is provided in the pipe 4 to regulate or cut off the vacuum; the other nipple 3 is connected by a pipe 8 to the pulsator 9, which controls the vacuum at the teat-cups. The nipples 3 permit the ready attachment and detachment of the pipes 4 and 8 as required.

A simple form of vacuum producing apparatus 5, is illustrated and consists of an ordinary ejector, one located at each milking station, and the vacuum produced thereby acts through the pulsator 9 and pipe 8 leading to the milk receptacle 1, preferably alternately upon two cows, through two junction boxes 11 and 11ª, respectively connected with opposite ends of the pulsator 9 by pipes 10; and teat-cups 12 are connected to the respective junction boxes by flexible pipes 13, the ends of which are slipped upon nipples 14 which project from the junction boxes.

The ejector vacuum producing device shown in section, in Fig. 7, consists of a nozzle $v$ opening from a passage connected with the compressed air pipe A. $v'$ is the ejector mouth piece into which the nozzle discharges the compressed air, which draws air from the surrounding chamber, the pipe 4, and the chamber 6 and milk receptacle 1, thus producing the requisite vacuum therein. The mouth piece $v'$ discharges through a check-valve $v^2$, see Fig. 7ª, which automatically closes by means of the gravity valve $v^3$ whenever the ejector ceases to operate. In the pipe 4 between the vacuum producing device 5 and the vacuum tank 6, there is also a check-valve, shown in section in Figs. 8 and 9, in which 18 is the valve provided with vertical grooves $g$ in its cylindrical periphery, and it is held to its seat by a spring 19. The stem of this valve is adapted to slide in a guide $h$ supported by a cross-bar $i$. The suction of the ejector readily raises the valves 18 to produce vacuum in the chambers and passages below it, but as soon as the ejector ceases to operate the spring 19 closes the valve. The vacuum tank may be provided with a gage 6ª and a releasing valve 6ᵇ.

Besides the vacuum pipes 10 which connect the two ends of the pulsator 9 with the junction boxes 11, 11ª, compressed air pipes 15, lead from the pipe A to the junction boxes through branch pipes A¹, each provided with a valve A² to control the flow of compressed air to pipes 15. Each valve A² is provided with an operating lever A⁵. In the sectional view of the valve A² (Fig. 10), A¹ is the compressed air inlet, A³ is a hollow plug having a nipple outlet A⁴ to which a pipe 15 is attached, and this plug may be turned by a lever A⁵. The compressed air port A⁶ in the valve seat is provided with an adjustable needle valve A⁷ to regulate the flow of compressed air. The junction boxes 11, 11ª, are provided at one end with a flexible diaphragm 16 for the purpose hereinafter set forth.

Referring to Figs. 12, 13, the pulsator 9 consists of a tube P having two ports $p'$ opening into a chamber to which the vacuum pipe 8, from the milk receptacle 1, is connected. Within this tube P is a sliding plunger valve $p^2$ adapted alternately to open and close the ports $p'$ as the valve is reciprocated therein. To each end of the pulsator tube P, a pipe 10 is attached which connects the pulsator with one of the junction boxes 11 or 11ª. By means of an arm $p^3$ projecting from the plunger $p^2$ through a slot $p^4$ in the tube P, the plunger valve of the pulsator may be operated.

All the above described parts of the milking machines, and also the electrical devices hereinafter described by which the pulsator and other valves are operated, are supported upon a light portable frame F. Heretofore the pulsator and other parts have been supported upon the milk receptacle.

The means by which the pulsators and other operating parts of the milking machine are electrically operated are as follows:—At a convenient position is a source of electrical energy, such for instance, as a dynamo 20, or other electrical generator, electrically connected with which is a make-and-break circuit changing device 21, which as illustrated, is in the form of a cylinder 22 of insulating material upon a suitable shaft 23 supported in bearings on the frame 24, (Fig. 15). Upon either end of the cylinder 22 are secured collecting rings 25 of metal, on which brushes 26, 27 of metal, or other electric conducting material rest. These brushes are in circuit with the electric generator 20, and between the two collecting rings 25 secured to the cylinder 22, there is a two-part commutator construction separated from the rings 25 by insulating collars I, and a third brush 28 is in contact with this commutator. One commutator segment S is electrically connected at $t$ to one of the collecting rings 25, and the other segment $S^1$ is electrically connected at $t'$ to the other collecting ring. One end of the wires 29, 30, 31, of a three wire circuit, are respectively connected to the brushes 26, 28, 27. The wire 30 which is connected to the brush 28 is a neutral wire, while the other two 26, 27, may be termed the positive and negative wires. This three wire circuit extends throughout the length of the building, and at each milking station a branch therefrom leads to suitable binding posts, through which the positive and negative wires 29, 31, are connected with the outer ends of the windings of a double coil solenoid 32—33, which may be designated, the main solenoid, and the neutral wire 30 is connected at 34 with a conductor which joins the inner ends of those windings, (see Fig. 17). The double solenoid 32—33 is provided with a core 35, and by means of suitable stops 70, 71, of non-magnetic material its movement is limited in each direction. The action of these two parts, the circuit changer and the solenoid 32—33, is as follows:— When the neutral or middle brush 28 is resting upon the insulating material separating the two parts of the commutator, the two windings of the solenoid 32—33 are taking current in series, thus giving a high resistance across the circuit and consequently only a small current is flowing through it. This current is sufficient, however, to moderately energize the coils 32—33, but equally, and their core 35 remains at rest. When, however, the middle brush 28 makes contact with one of the metal segments of the commutator, the current is short-circuited to one of the coils 32 or 33, and the resistance is then one-half what it was when the coils were in series, consequently there is a magnetic saturation of the core 35 which is strongly attracted by the highly energized coil 32 or 33, and the core is moved to the stop within that energized coil. As the brush 28 leaves this segment and momentarily rests upon the strip of insulating material, the solenoid coils instantly become in series again and the core remains at rest. The current is now cut off from the coil just energized, except what it takes in series with the other coil of the solenoid; hence it does not wholly lose its magnetism and the inductive discharge is greatly reduced, thus preventing sparking at the neutral brush of the circuit breaker, which makes the apparatus more enduring and reliable. Upon further rotation of the commutator cylinder the reverse action takes place, the other coil is energized and the core 35 is instantly drawn to the opposite position. To this movable core 35 midway between the two coils 32—33 of the main solenoid, is secured a bar 36 having a hole or socket in its outer end, and into this socket the end of the arm $p^3$ of the valve $p^2$ of the pulsator projects, by which a reciprocating movement is imparted to it corresponding to that of the core 35, so long as the dynamo 20 is in operation. The movement of the pulsator valve is instantaneous in response to the change of brush contact at the circuit changer with a " dwell " at the end of each pulsation. This produces a sharp cut off of the suction and a period of rest on one side of the pulsator and at the same moment, gives instantaneous action of the suction on the other side, at full power. This suction is prolonged during the " dwell " or period of rest of the pulsator valve between movements.

The circuit changer or commutator cylinder is rotated by means of a small motor 50, (Fig. 1), through a connecting belt 51 running upon suitable pulleys upon each apparatus. The speed of the motor 50 may be varied as desired by means of a variable resistance 52 in circuit with it. When found desirable a non-inductive resistance 53 may be employed in the milking machine circuit, more particularly when the machines are connected up in multiple in a large stable.

From one side of the electric circuit which energizes the coils 32—33 of the main solenoid, a branch wire leads to points 65, 66, 67, where it is connected to two other pairs of solenoid coils, 37—38, 39—40, (Figs. 2, 4, 17), which may be designated, auxiliary solenoids, and which are also respectively provided with reciprocating stopped cores 41 and 42, the construction being similar to that of the main solenoid 32—33, each of which cores is connected by a forked rod 43, (Fig. 2), with one of the levers $A^5$ of the compressed-air valves $A^2$; and immediately that the solenoid core 35 operates upon the pulsator 9 to cut off the suction from any junction box 11 or $11^a$, a coil 38 or 39 of one of the auxiliary solenoids is energized by the circuit closed by the contact of piece 60, with springs 61, 62, or 63, 64, and acts to open a valve $A^2$; and by means of a pipe 15 leading from said valve to a junction box 11 or $11^a$, a puff of air is thrown into said box, thus partially destroying the vacuum therein and permitting the diaphragm 16 to return to its normal position, from which it had previously been drawn by the greater vacuum. To limit the amount to which said vacuum shall be reduced in the junction box, a spring controlled arm 17 is attached to the flexible diaphragm, one end of which arm is held in an insulated bracket on the junction box, while the other, free, end of the arm is adapted to make contact with an adjustable screw 46 in another insulated bracket thereon. The spring arm 17 and its contact 46, at each junction box, are respectively in circuit with one of the coils 37, 40 of the auxiliary solenoids through a small electro-magnet 48 or 49, and as soon as the diaphragm 16 is released by the reduction of vacuum in the junction box, the contact of the arm 17 and screw 46 closes the circuit through one of the coils 37 or 40, and magnets 48, or 49, causing the latter to attract a circuit breaking lever 68 or 69, thus opening the circuit through coils 38 or 39, and at the same time causing coil 37 or 40 to pull its core in a direction to close the valve $A^2$ and stop the flow of compressed air to the junction box.

Upon the side of the core 35 opposite to that occupied by the pulsator 9, a vibrating lever 44 is pivoted upon a standard 45, one end of which lever has a forked engagement with the core 35 and the other end carries an insulated electric conducting piece 60. This lever 44 is caused to vibrate by the movement of the core 35 at the same time that the pulsator valve $p^2$ is moved thereby, and in the range of movement of the double contact piece 60 are the two pairs of spring contacts 61, 62, 63, 64, respectively connected in circuit with the coils 38 and 39 of the two auxiliary solenoids, and with the negative wire to the dynamo, and as the core 35 nears the end of its movement in either direction, the piece 60 is brought to bear upon one or the other of those pairs of contacts 61, 62, or 63, 64, and thus closes the circuit through one of the coils 38, 39, of the auxiliary solenoids, moves the core thereof, and as heretofore explained opens a valve $A^2$ and admits compressed air at the junction box.

The operations above described will be performed alternately upon the junction boxes and connected teat-cups which are in communication with the respective ends of the pulsator.

Referring to the diagram Fig. 17, the course of the electric current and the operation of the several parts of the apparatus controlled thereby, is as follows:—Starting at the generator 20 current goes out on the positive (+) side of circuit and returns to the generator on the negative (—) side. A two-wire circuit connects the generator 20 with circuit changing device 21, which, as described, has a neutral or third brush 28 that alternately makes contact with segments S, S' of the commutator, which segments are respectively connected, one to the positive side of the circuit and the other to the negative side, through the rings 25. From the neutral brush 28 which we will assume is resting on the segment S', which is connected to the negative side of the circuit, the current from the dynamo 20 goes out along the positive wire 31 from the circuit changer 21 to the outer end of main solenoid coil 32, from the opposite end of which coil the current divides according to the ohmic resistance of two paths, one leading through the coil 33 to the negative side of circuit, and one by way of a neutral point 34 between the coils 32, 33 to the neutral wire 30 (see dotted line) to the circuit changer 21, where it also goes, through the brush 28, to the negative wire 29 back to the dynamo. As the coil 33 is of high resistance and the path through 21 very low resistance, a very large proportion of the current passing through 32 flows through the wire 30. Hence the coil 32 is highly energized causing plunger 35 to instantly move to its stop in said coil 32. This movement of plunger 35 operates to close the vacuum port and its connection to junction box 11 on the left side of the pulsator G by means of its valve $p^2$, which, through the arm $p^3$ and bar 36 is connected to said plunger 35, and opens the vacuum port and its connection with junction box $11^a$ on the right. At the same instant that the valve $p^2$ reaches the end of its stroke in this direction, the vibrating lever 44 is turned upon its pivot 45 by its connection with the core 35, and the contact piece 60 on the opposite end of lever 44 is thrown against the two spring contacts 61, 62, thus closing a circuit through coil 38 of one of the auxiliary solenoids. This energizes winding 38 causing its plunger 41 to instantly move to a stop in said coil 38, and by this movement opens the air valve $A^2$ connected therewith, from which a puff of air from the compressed air system is delivered to the junction box 11 on the left side of diagram Fig. 17. This puff of air reduces the vacuum which remains from the previous action of the pulsator in said junction box 11 and connected teat-cups, sufficiently to permit the diaphragm 16 to assume its normal position by the action of the spring controlled arm 17, which then makes contact with the screw 46 and thus closes the circuit through those contacts and the solenoid coil 37 and electro-magnet 48, and by way of the dotted lines 29 back to the generator 20. The passage of this current through the said junction box connections accomplishes two things, namely, it energizes the solenoid coil 37 and also the series magnet 48, by the action of which latter the cut-out 68 is instantly opened, thus cutting off the current by which the coil 38 was energized and the air valve $A^2$ was opened, and at the same time by energizing the coil 37 causes its plunger 41 to be instantly drawn to a stop in that coil, and by the connection of this plunger with the air valve $A^2$ closes it, and cuts off the flow of compressed air to the junction box 11. Further rotation of the circuit changer 21 shifts the current through the neutral brush from the negative side of the main circuit to the positive side through the segment $S'$ and the other collecting ring 25. This acts to reverse the motion of plunger 35 of the main solenoid 32—33, and move it to a stop in the coil 33, which motion reverses the position of valve $p^2$ of pulsator P, closes the vacuum port to junction box $11^a$ and opens it to box 11, and also moves the contact piece 60 so that it bears upon the spring contacts 63, 64. Suction is now acting in the junction box 11 on the left of the diagram, and the vacuum therein is instantly raised to the maximum point, which by reason of its flexible diaphragm 16 separates contacts 17, 46, and cuts off the current from series magnet 48; and the circuit breaker 68 responding to the action of its controlling spring, closes the circuit ready for a repetition of movements. This completes a cycle of one side of the machine. When this cycle is complete on the left side, the actual working of one-half of the machine has been accomplished. During the time vacuum has been reduced to the minimum at junction box 11 on the left side of the machine, the high vacuum and suction at the junction box $11^a$ on the right side of the machine has been in progress, and the same operations were performed on that side as are above described for the left side of the apparatus.

The so-called solenoid form of electro-magnet coils with a movable stopped core for actuating the pulsator valve, is illustrated and described; but it is evident that two opposed electro-magnets with fixed cores, and a reciprocating armature between them, may be used instead of the solenoid type, although the latter are preferable as they give a greater range of movement. Opposed electro-magnets of the fixed core type are also subject to other difficulties of construction and arrangement for operation, which makes them less desirable for the purpose than the solenoid type in such machines.

Only one pair of milking machines is shown in the drawings, but any number, of identically the same construction, may be employed and the electro-magnetic apparatus of each, connected in multiple with the main electric circuit, by which means all of the machines will act synchronously, at the same speed and with equal efficiency.

I claim:—

1. In a milking machine, a pulsator connected with the teat-cups, a double coil solenoid, a reciprocating core therefor connected with the pulsator valve, a source of electrical supply in circuit with the two solenoid coils, and means to direct the current through the two coils in series and alternately therewith through one and then the other of such coils.

2. In a milking machine provided with teat-cups, and a vacuum producing apparatus, a pulsator through which vacuum is applied to the teat-cups, electrical means to operate the pulsator valve, a junction box to which the vacuum pipe and teat-cups are connected, a compressed air pipe connected with the junction box, a valve in said pipe, and electrical means to operate the compressed air valve immediately after the operation of the pulsator valve.

3. In a milking machine provided with teat-cups, and a suction and a compressed air apparatus, a junction box with which the teat-cups, a suction and a compressed air pipe, are connected, a pulsator in the suction pipe connection and a valve in the compressed air pipe, electrical means to operate the pulsator and immediately thereafter to open the said air valve, and means at the junction box, operated by the action of the compressed air, to cause said electrical means to close the compressed air valve.

4. In a milking machine provided with teat-cups, and a suction and a compressed air apparatus, a junction box for said cups and a suction and a compressed air pipe, a flexible diaphragm in said box, an electrical circuit breaking device connected with the diaphragm, which opens the circuit when deflected by vacuum in the box, and closes the circuit when vacuum therein is relieved.

5. In combination with a milking machine provided with teat-cups and vacuum and compressed air connections therewith, an electrically operated pulsating valve in the vacuum connection, and an electrically operated valve in the compressed air connection.

6. In combination in a milking machine, two groups of teat-cups, a vacuum producing apparatus at the machine, a milk receptacle connected therewith, vacuum connection between the milk receptacle and the two groups of teat-cups through a pulsator, and a single pulsator to open the connection between the milk receptacle and the respective groups, alternately.

7. In combination in a milking machine, two groups of teat-cups, a vacuum producing apparatus, a milk receptacle connected therewith, vacuum connection between the milk receptacle and the two groups of cups, a pulsator in such connection to apply suction alternately to the respective groups, and a compressed air connection between the pulsator and each group of cups, to reduce the vacuum therein to a predetermined minimum immediately following each pulsator action.

8. In a milking machine provided with teat-cups, vacuum connection therewith through a pulsator, and valve controlled compressed air connection between the pulsator and the cups, the combination of main electrical devices to operate the pulsator valve, and auxiliary electrical devices, put in circuit by the action of the main devices, to operate the compressed air valve.

9. In a milking machine provided with teat-cups having vacuum and compressed air connections, the combination of a pulsator in the vacuum connection, a main solenoid having a limited or stopped core, mechanically connected with the pulsator valve, an auxiliary double coil solenoid put in circuit by the action of the main solenoid, a movable core in the auxiliary solenoid, which core is mechanically connected with a valve in the compressed-air connection, an electrical generator in the circuit with said solenoids and a circuit changing device to cause the current to flow through the respective solenoids in a manner to move their cores alternately in one direction and then the other.

10. In an electrically controlled milking machine provided with teat-cups connected with a junction box to which vacuum and compressed air pipes lead, a pulsator in the vacuum pipe, and a valve in the compressed air pipe, a main solenoid to operate the pulsator valve, an electric circuit-breaker opened by vacuum action and closed by compressed air action at the junction box, an auxiliary solenoid and an electro-magnet in circuit with the circuit-breaker, and a cut-out for this latter circuit operated by the electro-magnet.

11. In an electrically controlled milking machine provided with teat-cups, and vacuum producing connection therewith, a pulsator in the vacuum connection, a double coil magnet adapted to operate the pulsator valve, an electric generator, a three-wire circuit between the generator and said magnet coils, and a circuit changer in said circuit adapted to direct the current through the two coils in series and alternately therewith through the respective coils.

12. The combination of a plurality of pairs of milking machines, a single pulsator to control the vacuum for each pair, a double coil electro-magnet to reciprocate each pulsator valve, an electric generator, a three-wire circuit with which the magnet coils of the several pairs are connected in multiple, and a circuit changer which synchronously directs the current alternately to one and then the other of the respective magnet coils of the several milking machines.

13. The combination of a plurality of pairs of milking machines, a single pulsator to control the vacuum for each pair, a pair of electric coils to reciprocate each pulsator valve, an electric generator, a three-wire circuit from the generator, with which the several magnet coils at the respective milking machines are connected in multiple, a circuit changer which synchronously directs the current alternately to one and then the other of the respective magnet coils of the several machines, and a variable speed motor to operate the circuit changer.

MILTON A. HICKS.

Witnesses:
R. C. BIDWELL,
F. C. HILDRETH.